(12) United States Patent
Ye et al.

(10) Patent No.: US 6,866,061 B2
(45) Date of Patent: Mar. 15, 2005

(54) BACK PRESSURE VALVE WITH DYNAMIC PRESSURE CONTROL

(75) Inventors: Jianming Ye, North York (CA); Todd A. Simpson, Brampton (CA)

(73) Assignee: Hydrogenics Corporation, Mississauga (CA)

( * ) Notice: Subject to any disclaimer, the term of this patent is extended or adjusted under 35 U.S.C. 154(b) by 19 days.

(21) Appl. No.: 09/961,092

(22) Filed: Sep. 24, 2001

(65) Prior Publication Data

US 2003/0056830 A1 Mar. 27, 2003

(51) Int. Cl.$^7$ ............................................. G05D 16/20
(52) U.S. Cl. ........................... 137/487.5; 137/505.14; 137/505.41; 251/61.02
(58) Field of Search ...................... 137/505.41, 505.42, 137/487.5, 488, 495, 500, 505.14, 505.15, 510; 251/61.1, 61.2, 331

(56) References Cited

U.S. PATENT DOCUMENTS

| | | | | |
|---|---|---|---|---|
| 1,557,192 A | * | 10/1925 | Brunning | 62/181 |
| 2,941,543 A | * | 6/1960 | Kleczek | 137/505.18 |
| 3,336,843 A | | 8/1967 | Griswold | |
| 3,529,622 A | | 9/1970 | Weise et al. | |
| 3,762,436 A | * | 10/1973 | Clayton | 137/505.35 |
| 3,767,159 A | | 10/1973 | Treul | |
| 4,190,071 A | | 2/1980 | Dean et al. | |
| 5,251,148 A | * | 10/1993 | Haines et al. | 700/282 |
| 5,381,816 A | * | 1/1995 | Alsobrooks et al. | 137/15.22 |
| 5,678,601 A | * | 10/1997 | Engel | 137/486 |
| 5,944,050 A | | 8/1999 | Walker | |
| 6,056,008 A | | 5/2000 | Adams et al. | |
| 6,305,401 B1 | * | 10/2001 | Uehara et al. | 137/102 |
| 6,418,956 B1 | * | 7/2002 | Bloom | 137/14 |

FOREIGN PATENT DOCUMENTS

| | | | |
|---|---|---|---|
| EP | 0 805 294 | | 11/1997 |
| JP | 09-088733 | | 3/1997 |
| JP | 09-101826 | | 4/1997 |
| WO | WO 00/36482 | * | 6/2000 |
| WO | WO 01/04718 A1 | | 1/2001 |

OTHER PUBLICATIONS

Tescom Corporation Electronic Controls Division, ER3000 Electronig Pressure Controller, User Manual, 4 pages from manual.
Tescom Corporation, 2 sheets of print advertising.

* cited by examiner

*Primary Examiner*—Ramesh Krishnamurthy
(74) *Attorney, Agent, or Firm*—Bereskin & Parr (57) ABSTRACT

A back pressure valve, comprises: a first housing including a first chamber formed therein having an inlet and an outlet for a first fluid; a second housing including a second chamber formed; a flexible diaphragm having an outer peripheral edge portion abutting the second housing; and closing off the second chamber; a back pressure member moveably disposed in the first chamber of the first housing, wherein the first chamber is defined by the first housing and the back pressure member; wherein the flexible diaphragm is fixed onto and moveable together with the back pressure member, whereby pressure in the second chamber determines fluid pressure required to maintain the back pressure member in a steady position.

17 Claims, 6 Drawing Sheets

FIG. 1

PRIOR ART

BACK PRESSURE VALVE WITH DYNAMIC PRESSURE CONTROL

FIELD OF THE INVENTION

The present invention relates to a back pressure valve. More particularly, the present invention relates to a combination of a back pressure valve and a pressure controlling device.

BACKGROUND OF THE INVENTION

Back pressure valves are well known in the art and are generally employed in fluid exhaust lines. A back pressure valve is designed to maintain a given pressure drop across it as a fluid flows past it. Various designs of back pressure valves are available, including a valve that comprises a flexible diaphragm resiliently urged against a valve seat.

The basic principle of diaphragm-based back pressure valves is to provide an outlet member with an end or sealing face. A flexible diaphragm is mounted spaced slightly from the sealing face surrounding the outlet member. An adjustable spring is provided for adjusting a load on the diaphragm, pressing the diaphragm against the sealing face. An inlet chamber is usually annular and surrounds the outlet member. Thus, for fluid to flow from the inlet chamber to the outlet member, the fluid pressure must be high enough to displace the diaphragm away from the sealing face, and then fluid flows from the annular inlet chamber across the sealing face to an outlet chamber. If the fluid pressure is too low, then the load or pressure set by the spring maintains the diaphragm pressed against the sealing face.

There are a number of problems associated with conventional back pressure valves. Firstly, conventional back pressure valves tend to be large and cumbersome. Secondly, conventional back pressure valves only serve to relieve pressure, and thus do not accurately sense or control the pressure. Accordingly, separate measuring and controlling devices must be provided to work in conjunction with the back pressure valve to maintain a stable pressure. This necessitates additional lines and/or hoses, thus increasing the size and complexity of the system. Additionally, since conventional systems have two separate devices for the relief and control of fluid pressures, the systems tend to be slow acting, and possess inadequate dynamic controllability. In conventional back pressure valves, the area of the diaphragm subject to fluid pressure is larger in the open state than in the closed state, as in the closed state only an outlet annular area is subject to fluid pressure. This again affects the performance of the valve.

There remains a need for a back pressure valve with a pressure controlling device that can offer rapid dynamic fluid pressure control, as well as precise and accurate control of fluid pressures in a line.

SUMMARY OF THE INVENTION

In accordance with the present invention, there is provided a back pressure valve, comprising:

(a) a first housing including a first chamber formed therein having an inlet and an outlet for a first fluid;

(b) a second housing including a second chamber formed therein;

(c) a flexible diaphragm having an outer peripheral edge portion abutting the second housing; and closing off the second chamber;

(d) a back pressure member moveably disposed in the first chamber of the first housing, wherein the first chamber is defined by the first housing and the back pressure member; wherein the flexible diaphragm is fixed onto and moveable together with the back pressure member, whereby pressure in the second chamber determines fluid pressure required to maintain the back pressure member in a steady position.

The back pressure member preferably is moveable to a closed position wherein the back pressure member seals off the passage between the fluid inlet from the fluid outlet.

The second housing can include at least one port for supply of a second fluid to the second chamber to set the pressure in the second chamber and thereby determine said preset pressure required to maintain the back pressure member in the steady position.

In one embodiment, the first housing defines a bore, wherein the fluid inlet and the fluid outlet open into the bore, and wherein the back pressure member is slidably mounted in the bore for movement within the bore.

Preferably, the back pressure valve further comprises a sleeve member disposed within the first housing and providing said bore for the back pressure member, the sleeve member being fixed onto the first housing and having an opening that is closed by the back pressure member in the closed position and that permits the fluid to flow from the fluid inlet to the fluid outlet when the back pressure member is in the open position.

Preferably, the back pressure valve further comprising a holding means attached to the flexible diaphragm and holding the back pressure member to the diaphragm, whereby the back pressure member and the diaphragm are moveable together.

Preferably, the second housing accommodates pressure controlling devices therein. More preferably, the second housing is provided with pressure adjusting mechanism to adjust the pressure in the second chamber.

The present invention has many advantages over the prior art. The valve is very compact and thus can be used in applications where size restrictions apply. The valve is more responsive and can dynamically controls the pressure of the fluid, thus allowing rapid changes and providing precise and accurate fluid pressures. This removes the need for additional lines and/or hoses, thus simplifying the overall system and making it more energy efficient and cost effective.

BRIEF DESCRIPTION OF THE DRAWING FIGURES

For a better understanding of the present invention, and to show more clearly how it may be carried into effect, reference will now be made, by way of example, to the accompanying drawings, which show a preferred embodiment of the present invention and in which.

DETAILED DESCRIPTION OF THE INVENTION

Figure 1:
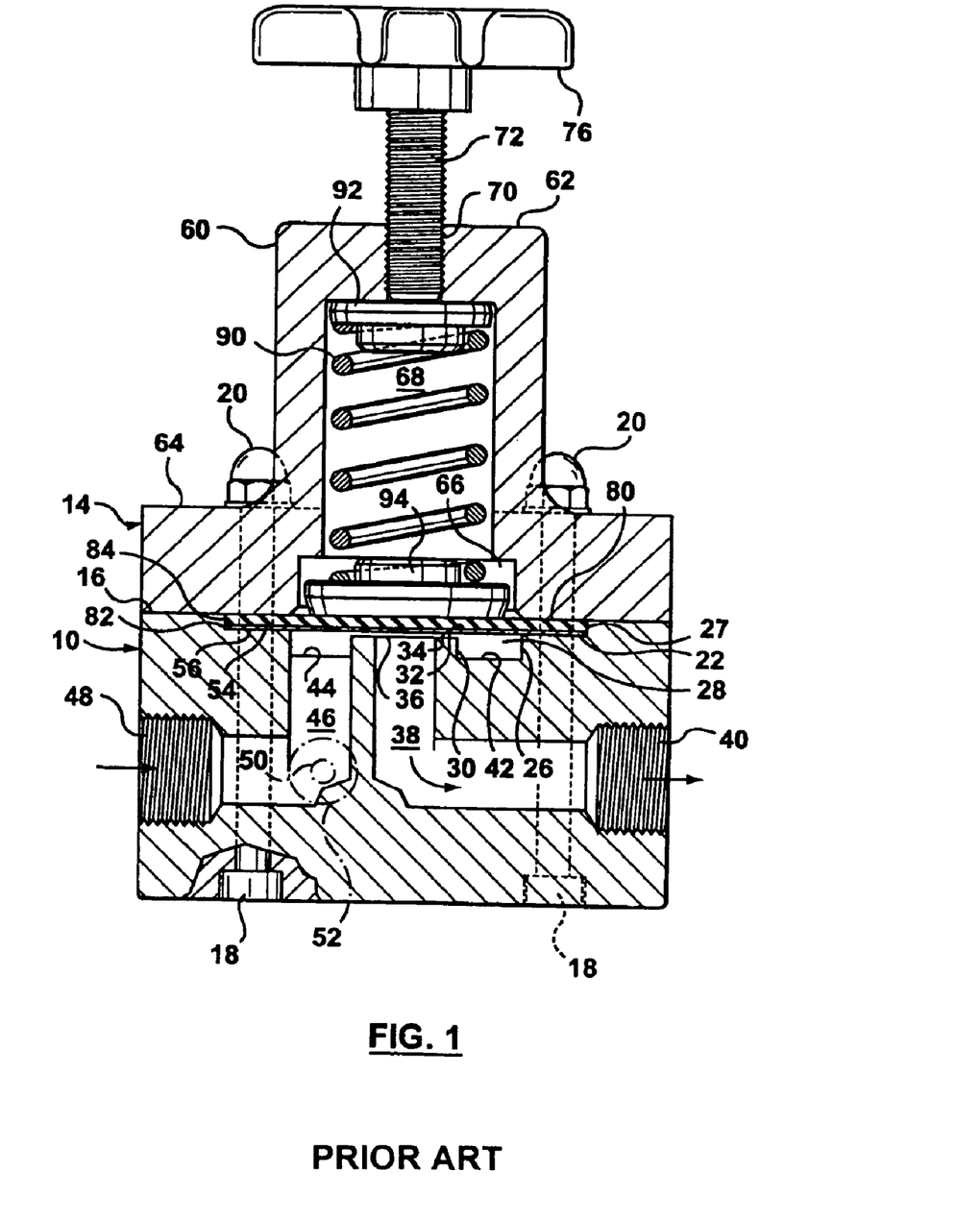
FIG. 1 shows a sectional view of a conventional back pressure valve.

FIG. 1 shows a conventional back pressure valve as disclosed in U.S. Pat. No. 5,944,050, with a flexible diaphragm. This conventional back pressure valve has a valve body 10 with a tubular outlet member 30 having an outlet 36 surrounded by an end face 32, and an annular inlet chamber 28 surrounding the outlet member 30. The annular inlet chamber 28 has an outer periphery defined by a wall member 26. The wall member 26 has an end face 54 in a plane spaced away from a plane defined by the end face 34 of the outlet member 30.

A flexible diaphragm 80 has an outer peripheral edge portion clamped between the end face 54 of the wall member 26 and a clamping member 14. The central portion of the flexible diaphragm 80 is spaced from the end surface of the outlet member 30 when the diaphragm is in an undeflected position. A resilient force applying device, usually a spring 90, is operable to apply a predetermined force to the diaphragm 80 to cause the diaphragm to be deflected into engagement with the end face 34 of the outlet member 30. A release device, for example a handle 76, is operable to remove the force from the diaphragm to permit the diaphragm 80 to move away from the end face 34 of the outlet member 30 and otherwise to regulate or to adjust the force applied by the spring 90. An aperture 44 is provided in the annular inlet chamber 28.

In operation, the diaphragm 80 is deflected by the spring 90 against the end face 34 of the outlet member 30, such that the outlet 36 and hence the valve are closed. When the fluid pressure, supplied through an inlet 48, exceeds a pre-set or reference pressure, the diaphragm 80 is pushed away from the end face 34 against the resilient force of the spring 90, thus opening the valve. Once the valve is open, fluid flows from the inlet 48 and through the aperture 44 into the inlet chamber 28. Then, the fluid continues to flow through the outlet 36, and ultimately exits the valve through the outlet 40.

Figure 2A:
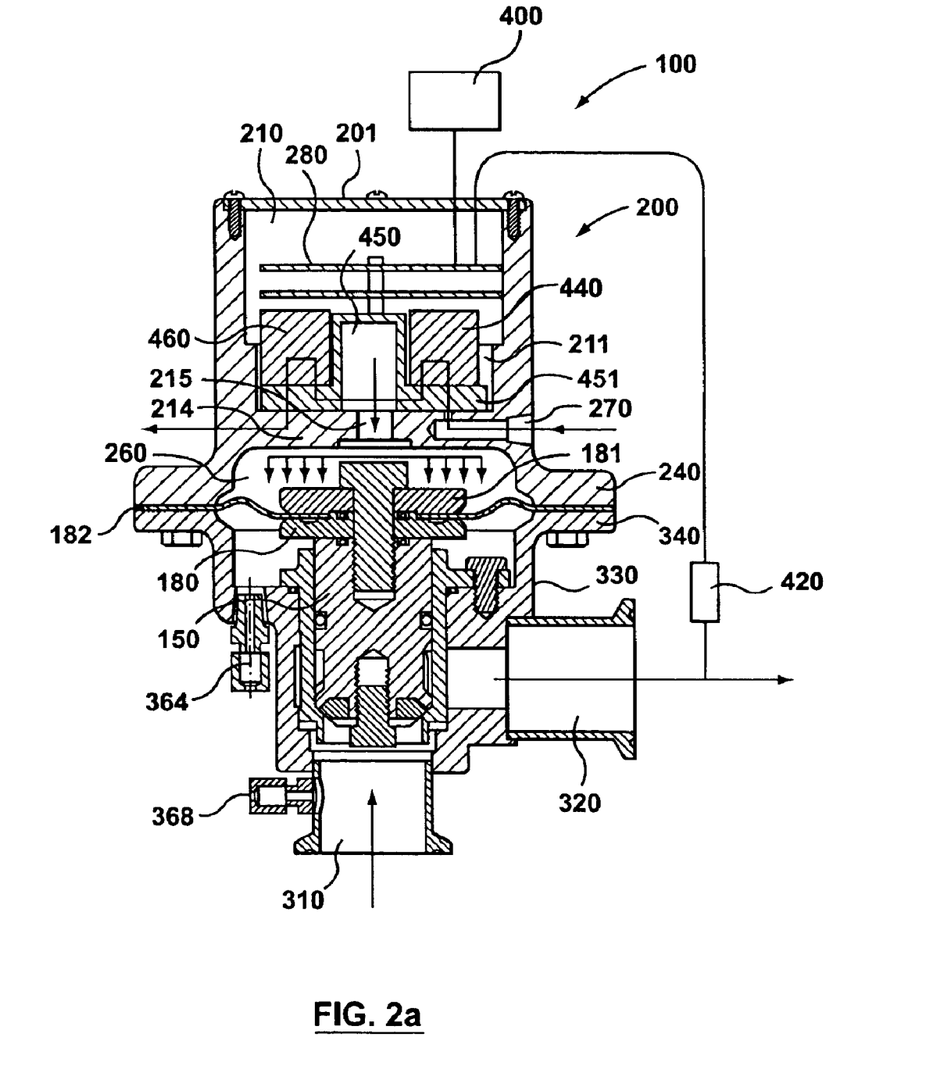
FIG. 2a shows a longitudinal sectional view of a back pressure valve in accordance with the present invention.
Figure 2B:
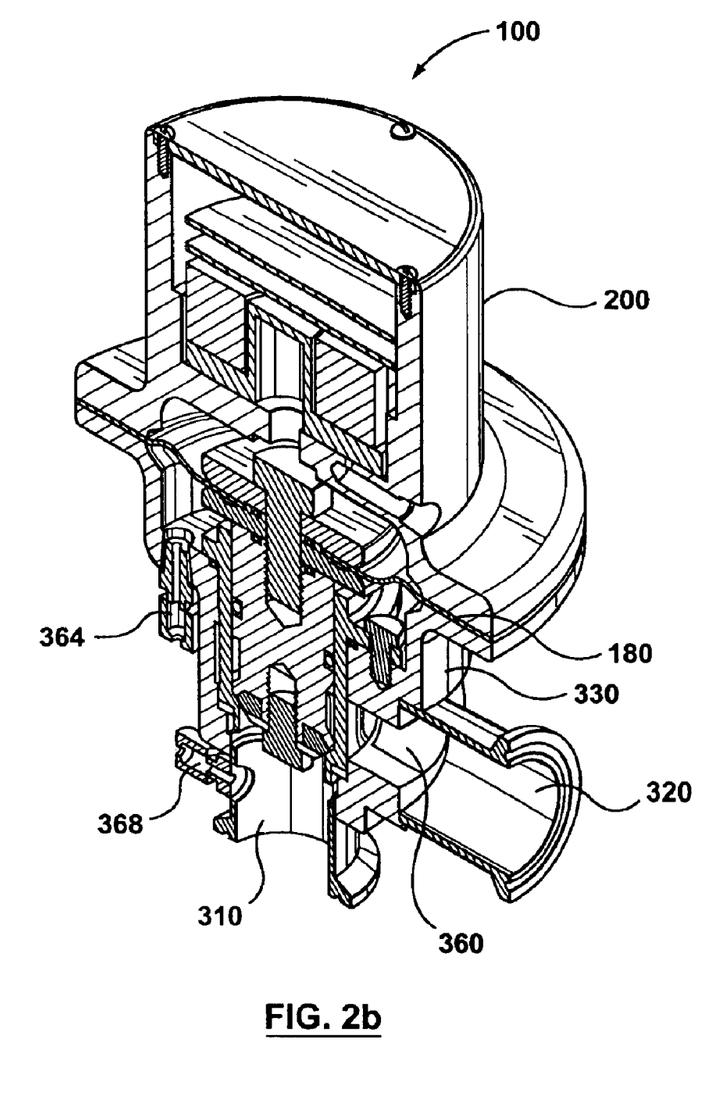
FIG. 2b shows a perspective sectional view of a back pressure valve in accordance with the present invention.

Referring first to FIGS. 2a and 2b, different views of a back pressure valve 100 according to the present invention are shown. By way of simplicity, the preferred embodiment will refer to the control and regulation of a gas. However, it is understood that the back pressure valve might be used to control and regulate any fluid, including various gases liquids, vapors or mixtures thereof.

Still referring to FIGS. 2a and 2b, the back pressure valve 100 generally comprises a pressure controller body 200, a pressure regulator body 330, and a flexible diaphragm 180 disposed between the controller body 200 and the pressure regulator body 330. During operation, the valve 100 may be in a substantially vertical position, with the pressure controller body 200 on top of the pressure regulator body 330. Alternatively, the valve may also be placed in any non-vertical positions, including horizontal position. However, for simplicity in description, the valve will be described in a vertical position, and terms such as "vertical", "horizontal", "upper", "lower", etc., should be construed accordingly.

As shown in FIGS. 2a and 2b, the pressure regulator body 330 has a regulator inlet 310 and a regulator outlet 320 that are preferably in the form of two connector members that are separate from and attached to the pressure regulator body 330. Now referring to FIGS. 3a–3c, different views of the pressure regulator body 330 are shown. Preferably, the pressure regulator body 330 is generally cylindrical, and has a tubular inner space 305 for accommodating an inner trim assembly 150 (not shown in FIG. 3). At the upper end of the pressure regulator body 330, a flange 340 is provided. A plurality of holes 341 are provided around the flange 340 to enable the pressure regulator body 330 to be affixed to the pressure controller body 200. An annular recess 350 is provided in the central portion of the flange 340, and is defined by a wall member 351 and a bottom face 352. The annular recess 350 is axial with the tubular inner space 305. The central portion of the bottom face 352 is in fluid communication with the tubular inner space 305 of the pressure regulator body 330 while not in operation. Thus, the tubular inner space 305 has a smaller diameter than the annular recess 350.

Figures 3A, 3B, 3C:
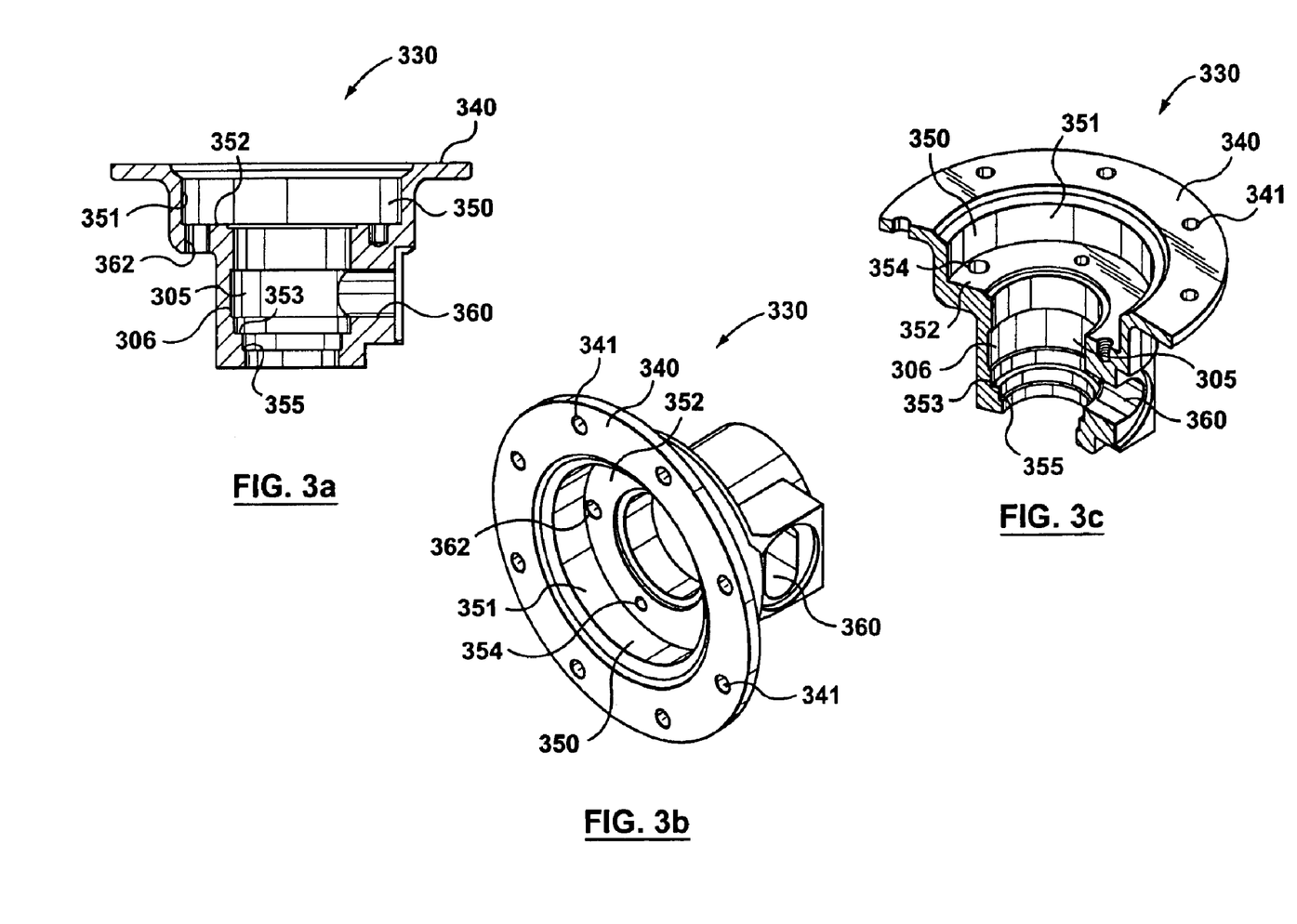
FIG. 3a shows a longitudinal sectional view of a back pressure regulator body in accordance with the present invention.
FIG. 3b shows a perspective view of a back pressure regulator body in accordance with the present invention.
FIG. 3c shows a perspective sectional view of a back pressure regulator body in accordance with the present invention.

Still referring to FIGS. 3a–3c, the tubular inner space 305 has a section at the bottom with a reduced diameter, thereby defining a first shoulder 353. Optionally, the tubular inner space 305 may have a second shoulder 355 to accommodate the regulator inlet connector 310. The pressure regular body 330 has a port 360 provided on the side wall thereof. The port 360 is in fluid communication with the tubular inner space 305, and is adapted to connect to the regulator outlet connector 320. More particularly, an annular collection channel 306 is provided in the tubular space 305, for reasons detailed below. On the bottom face 352 of the annular recess 350, a plurality of holes 354 are provided for affixing the inner trim assembly 150 (not shown) onto the pressure regulator body 330. Additionally, as shown in FIGS. 2a, 2b and 3a, a tapered bore 362 is provided on the bottom face 352 to accommodate a connector 364 (shown in FIGS. 2a, b). A connector 368 is in fluid communication with the regulator inlet 310. In operation, the connectors 364 and 368 are in fluid communication with each other, and hence the fluid in the recess 350 and the fluid in the main stream are communicated with each other and possess the same pressure. It is to be understood that the wall of the cylindrical pressure regulator body 330 can be provided with an internal bore to provide communication between diaphragm the recess 350 and the inlet 310. For simplicity, it is not shown herein.

Figure 4A:
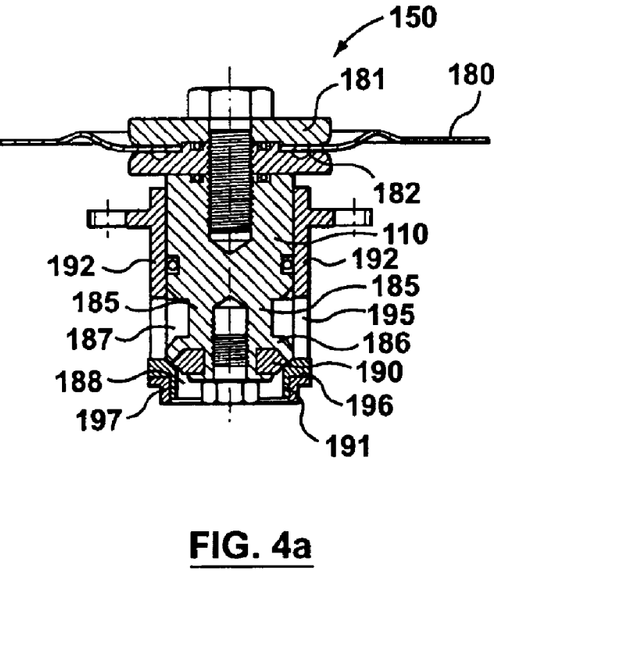
FIG. 4a shows a longitudinal sectional view of an inner trim assembly in accordance with the present invention.
Figure 4B:
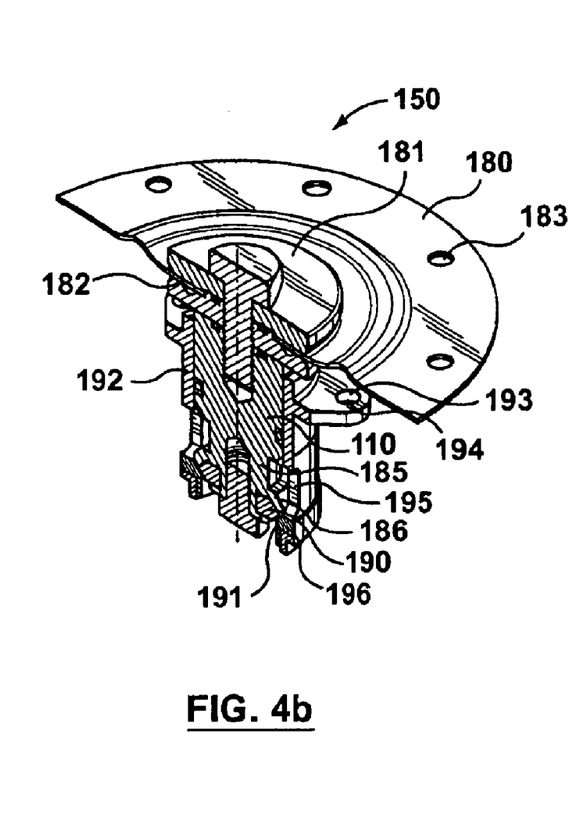
FIG. 4b shows a perspective sectional view of an inner trim assembly in accordance with the present invention.

Now referring to FIGS. 4a and 4b, different views of the inner trim assembly 150 are shown. The inner trim assembly 150 generally comprises a flexible diaphragm 180, and a valve plug 110. The diaphragm 180 is clamped between an upper holding plate 181 and a lower holding plate 182. The diaphragm 180 is preferably circular in shape, and has a plurality of holes 183 provided on the periphery thereof. The plurality of holes 183 are positioned to correspond with the plurality of holes 341 on the flange 340 of the pressure regulator body 330. Here, the diaphragm 180 has the same diameter as that of the flange 340. The upper and lower holding plates 181, 182 are also circular in shape, and have diameters that are less than the inner diameter of the recess 350 of the pressure regulator body 330. The valve plug 110 is also cylindrical in shape, and is positioned below the lower holding plate 182. The upper and lower holding plates 181, 182, the diaphragm 180 and the top end of the valve plug 110 each have a hole in the center thereof, to accommodate a fixing means, such as a screw or the like. In known manner, O rings can be provided between the holding plates 181,182 and the valve plug 110.

Still referring to FIGS. 4a and 4b, as the valve plug 110 extends downwardly in the axial direction, it has a reduced diameter portion 185. The reduced diameter portion 185 has a retention portion 186 extending radially from the lower end thereof. A first annular, flow channel 187 is defined by the reduced diameter portion 185 and the retention portion 186. The central portion of the reduced diameter portion 185 continues to extend downwardly, thereby forming an annular recess together with the retention portion 186. An annular seat disc 190 is disposed in the annular recess and abuts against the end face thereof. The central portion of the reduced diameter portion 185 is provided with a threaded base, on its axis. A fixing means, such as a screw, is inserted into this threaded base, fixing the seat disc 190 and the valve plug 110 together. The lower end of the seat disc 190 has an annular beveled sealing surface 191.

Still referring to FIGS. 4a and 4b, a sleeve 192 encloses the valve plug 110 and the seat disc 190. The sleeve 192 has a plurality of lugs 193 and holes 194, which are positioned to correspond with the plurality of holes 354 on the bottom end face 352 of the recess 350 of the pressure regulator body 330. Thus, screws or other fixing means are used to affix the sleeve 192 onto the pressure regulator body 330. A plurality of openings 195 are provided in the side wall of the sleeve 192, which are positioned to correspond to the first annular channel 187 of the valve plug 110. A circular shoulder 196 that extends radially inwardly from the inner wall of the sleeve 192 is provided below the openings 195. The circular shoulder 196 preferably has a beveled or conical sealing surface, for the beveled sealing surface 191 of the seat disc 190. As such, the seat disc 190 abuts against the circular shoulder 196, thereby isolating a second flow channel 188 defined by the seat disc 190 and the sleeve 192, from the first annular flow channel 187. The lower end of the sleeve 192 has a reduced diameter portion so that a sealing means, such as a gasket 197 or the like, may be disposed around it. The sealing means 197 has substantially the same diameter as that of the sleeve 192, and is adapted to abut against the first shoulder 353 of the pressure regulator body 330. The valve plug 110 is slidably fitted into the sleeve 192. As can be seen in FIGS. 2 and 4, an O-ring seal is provided between the valve plug 110 and the sleeve 192 above the openings 195.

Figure 5A:
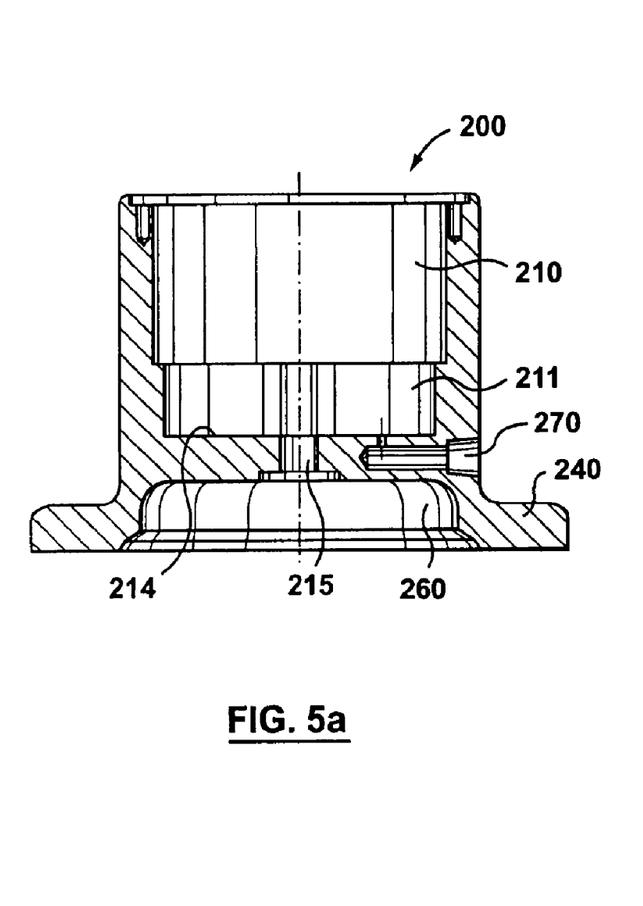
FIG. 5a shows a longitudinal sectional view of a pressure controller body in accordance with the present invention.
Figure 5B:
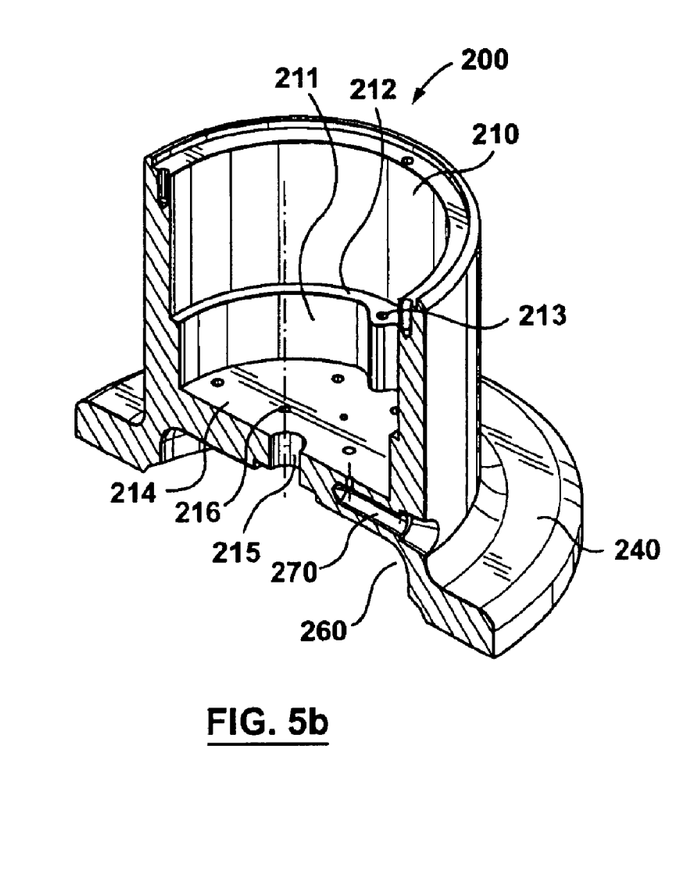
FIG. 5b shows a perspective sectional view of a pressure controller body in accordance with the present invention.

Referring now to FIGS. 5a and 5b, different views of the pressure controller body 200 are shown. The pressure controller body 200 is preferably cylindrical in shape, and has a flange 240 on one end thereof. A plurality of blind holes are provided on the flange 240 (not shown). The plurality of holes are positioned to correspond with the plurality of holes 341 on the flange 340 of the pressure regulator body 330. Accordingly, fixing means, such as screws or the like, may be used to attach the pressure controller body 200, the diaphragm 180, and the pressure regulator body 330 together there. The screws pass through plain holes 341 and engage threaded holes in the flange 240.

Still referring to FIGS. 5a and 5b, the pressure controller body 200 has a cylindrical chamber 210 formed therein for accommodating pressure sensing and controlling devices 280 (shown in FIG. 2a and 2b). Preferably, a reduced diameter portion 211 is formed in the chamber 210, thereby defining an annular shoulder 212. A plurality of mounting holes 213 may are provided on the shoulder 212 or radially inner extensions thereof, for mounting pressure controlling devices. The chamber 210 extends downwardly towards the flange 240. An end wall 214 having a certain thickness is provided at a position adjacent to and spaced from the flange 240. A recess 260 is thus formed in the central portion of the flange 240. The recess 260 has a limited depth and shares the end wall 214 with the chamber 210. A through hole 215 is provided in the center of the end wall 214 fluidly connecting the recess 260 with the chamber 210. A reference gas inlet 270 is provided around the side wall of the pressure controller body 200 at axial positions corresponding to that of the end wall 214. The gas inlet 270 extends radially inwardly within the end wall 214 to a certain depth. A plurality of through holes 216 are provided in the end wall 214. The through holes 216 are in fluid communication with the gas inlet 270.

As can be best seen in FIG. 2a, a gas dome 450 is mounted inside the chamber 210 on the end wall 214, closing the through hole 215 on one side. The gas dome has a generally cylindrical portion and a flange portion 451 on the lower end of the cylindrical portion. A gas inlet valve 440 and a gas outlet valve 460 are mounted on the flange portion 451. A plurality of holes (not shown) are provided on the flange portion 451. Some of the holes fluidly communicate between through holes 216 and the inlet (not shown) of the gas inlet valve 440, while the others fluidly communicate between the outlet (not shown) of the gas inlet valve 440 and the gas dome 450. Therefore, reference gas enters the pressure controller body 200 through the gas inlet 270 and flow along through holes 216, through holes on the flange 451. From here, the gas flows through the gas inlet valve 440 into the gas dome 450 which in turn communicates with the recess 260 via the through hole 215. Therefore, the gas flows to the recess 260 and applies reference pressure on one side of the diaphragm 180.

A reference gas outlet is also provided on the side wall of the pressure controller body. Particularly, since in this embodiment, the outlet is not in the same cross section as the inlet 270, it is not shown in FIG. 2a. However, it is to be understood that similar arrangement of flow path is provided between the gas dome 450 and the gas outlet. Pressure controlling devices 280 are disposed above the gas dome and control the gas inlet valve 440 and gas outlet valve 460 to adjust the reference gas pressure supplied to the gas dome 450. In addition, at least one port (not shown) for wires of the pressure controlling devices is provided on the side wall of the pressure control body 200. The pressure controlling devices 280 are in electronic communication with a processor, such as a computer 400 to transfer signals to and receive commands from the computer 400.

Referring now to FIGS. 2a and 2b, the open end of the chamber 210 of the pressure controller body 200 is closed by a cap 201. In operation, the pressure controller body 200 is mounted on top of the pressure regulator body 330 with the flexible diaphragm 180 being clamped between the flange 240 of the pressure controller body 200 and the flange 340 of the pressure regulator body 330. The gas inlet 270 is then in fluid communication with an external reference gas source (not shown) with a known reference pressure, and the interior of the gas dome 450 and the recess 260 form a second chamber, whose internal reference gas pressure is applied to the diaphragm 180. Therefore, the diaphragm 180 is subjected to a controlled pressure on the pressure controller side.

As shown in FIG. 2a, during operation, the incoming fluid enters the back pressure valve 100 through the inlet connector 310 of the pressure regulator body 330. Under steady conditions, that is, when the valve plug 110 is stationary at a certain position with respect to the sleeve 192, the forces applied on the valve plug 110 by the incoming fluid pressure and the reference pressure of the gas in the gas dome 450 satisfy a certain condition under which the system reaches equilibrium. The incoming fluid flows through the second flow channel 188, around the end of the valve plug 110 and into the first, annular flow channel 187. From the flow channel 187, the fluid flows through port 360 via openings 195 in the sleeve 192 and through the annular collection channel 306 and the port 360 the outlet connector 320, and ultimately exits the valve through the outlet connector 320.

By adjusting the set points in the computer 400, the computer will instruct the controlling devices 280 to actuate the gas inlet and outlet valves 440, 460 and hence adjust the reference pressure applied on the diaphragm 180 by the gas in the gas dome 450. As the reference pressure changes, the valve plug 110 may correspondingly move upward or downward since the diaphragm 180 is flexible, thereby adjusting the incoming fluid pressure by changing the flow path between the first flow channel 187 and the opening 195. When the valve plug 110 reaches a new equilibrium at a new position with respect to the sleeve 192, the incoming fluid pressure will be adjusted to a desired value. While the valve 100 is in the closed position, the bevel sealing surface 191 of the seat disc 190 presses against the bevel plane of the shoulder 196 of the sleeve 192. The valve plug 110 may reach equilibrium at any position with respect to the sleeve 192 and therefore, the incoming fluid pressure can be adjusted by changing the pressure of the reference gas. A pressure transducer 420 may be provided downstream of the pressure regulator to provide feedback signal to the pressure controlling device in the pressure controller body 200.

The present invention has many advantages over the prior art. The valve is very compact and thus can be used in applications where size restrictions apply. The valve is more responsive and can dynamically controls the pressure of the fluid, thus allowing rapid changes and providing precise and accurate fluid pressures. This removes the need for additional lines and/or hoses, thus simplifying the overall system and making it more energy efficient and cost effective.

While the above description constitutes the preferred embodiments, it will be appreciated that the present invention is susceptible to modification and change without departing from the fair meaning of the proper scope of the accompanying claims. For example, the shape of the present invention may be modified without affecting the operability of the device. The reference fluid may be any liquid instead of gas. It should be appreciated that the pressure sensing and controlling devices do not form part of the present invention.

It will be understood that the pressure regulator body 330 provides a first housing for the fluid whose flow is to be regulated, i.e. a first fluid. Correspondingly, the pressure controller body 200 provides a second housing, the recess 260 of which at least partially defines the second chamber. The upper part of the pressure controller body 200 forms another chamber.

What is claimed is:

1. A back pressure valve, comprising:
   (a) a first housing including a first chamber formed therein having a fluid inlet and a fluid outlet for a first fluid, the fluid outlet being an outlet of the back pressure valve;
   (b) a second housing including a second chamber formed therein;
   (c) a flexible diaphragm having an outer peripheral edge portion abutting the second housing and closing off the second chamber;
   (d) a back pressure member moveably disposed in the first chamber of the first housing for controlling fluid flow between the fluid inlet and the fluid outlet, wherein the first chamber is defined by the first housing and the back pressure member; and wherein the flexible diaphragm is fixed onto and moveable together with the back pressure member, whereby pressure in the second chamber determines fluid pressure required to maintain the back pressure member in a steady position;
   (e) a reference inlet and a reference outlet, for a reference fluid, provide in the second housing, and a control valve means in the second housing connected to the reference inlet and the reference outlet, for controlling the pressure in at least part of the second housing applied to the flexible diaphragm and the back pressure member;
      wherein the back pressure member is moveable to a closed position in which the back pressure member seals off fluid flow between the fluid inlet and the fluid outlet;
      wherein the first chamber includes a bore, wherein the fluid inlet and the fluid outlet open into the bore, and wherein the back pressure member is slidably mounted in the bore for movement within the bore;
      wherein the back pressure valve further comprises a sleeve member disposed within the first housing and providing said bore for the back pressure member, the sleeve member being fixed to the first housing and having a lower opening that is closed by the back pressure member in the closed position and that permits fluid to flow from the fluid inlet to the fluid outlet when the back pressure member is in an open position:
      wherein the back pressure member comprises a valve plug disposed substantially within the sleeve member; and
      wherein the back pressure member further comprises an annular seat member disposed at a lower end thereof, whereby, when the back pressure member is in the closed position, the annular seat member abuts a circular shoulder of the sleeve member to thereby close said lower opening.

2. A back pressure valve as claimed in claim 1, that includes at least one pressure controlling device connected to the control valve means.

3. A back pressure valve as claimed in claim 2, that includes a processor connected to the pressure controlling device.

4. A back pressure valve as claimed in 3, that includes a pressure transducer, for measuring pressure downstream of the outlet for the first fluid, and connected to the processor, to provide feedback on the downstream pressure.

5. A back pressure valve as claimed in claim 1, wherein the control valve means comprises a reference inlet valve for controlling flow of the reference fluid into the second chamber and connected to the reference inlet, and a reference outlet valve connected to the reference outlet for controlling flow of the reference fluid out from the second chamber.

6. A back pressure valve as claimed in claim 5, wherein the reference inlet and outlet valves are mounted on a member separate from and mounted on the second housing.

7. A back pressure valve as claimed in claim 6, wherein said member comprises a gas dome, and wherein the second housing includes an end wall on which the gas dome is mounted.

8. A back pressure valve as claimed in claim 7, wherein the end wall separates another chamber from the second chamber, with the first and second valves being located in the other chamber.

9. A back pressure valve as claimed in claim 8, wherein the second housing includes a through hole in the end wall, and wherein the gas dome is mounted on the end wall closing off the through hole.

10. A back pressure valve as claimed in claim 9, wherein the gas dome includes a flange portion abutting the end wall, the end wall and the flange portion each include at least one hole permitting reference gas to flow from the reference gas inlet to the reference inlet valve, the flange portion includes at least one hole permitting the reference gas to flow from the reference inlet valve to the interior of the gas dome and at least one hole permitting the reference gas to flow out from the interior of the gas dome to the reference outlet valve, and the end wall and the flange portion each include as least one hole permitting the reference gas to flow from the reference gas outlet valve to the reference gas outlet.

11. A back pressure valve as claimed in claim 10, wherein the gas dome includes a hollow cylindrical portion, with the flange portion provided around the hollow cylindrical portion.

12. A back pressure valve as claimed in claim 1, further comprising a holding means attached to the flexible diagram and holding the back pressure member to the diaphragm, whereby the back pressure member and the diaphragm are moveable together.

13. A back pressure valve as claimed in claim 1, further comprising a third chamber defined by the first housing, the sleeve member and the flexible diaphragm, the third chamber being in fluid communication with the first chamber.

14. A back pressure valve as claimed in claim 13, wherein the fluid communication between the first chamber and the third chamber is provided by a bore within the first housing.

15. A back pressure valve as claimed in claim 13, wherein a first connector is provided in fluid communication with the first chamber a second connector is provided in fluid communication with the third chamber and the fluid communication between the first chamber and the third chamber is provided via said first and second connectors.

16. A back pressure valve as claimed in claim 1, wherein the valve plug has an annular recess at a lower end thereof for receiving the annular seat member.

17. A back pressure valve as claimed in claim 1, wherein the sleeve member has at least one side opening and the valve plug has an annular flow channel which, when the back pressure member is in the open position, cooperates with the at least one side opening to provide fluid communication between the lower opening and the fluid outlet.

* * * * *

UNITED STATES PATENT AND TRADEMARK OFFICE
CERTIFICATE OF CORRECTION

PATENT NO. : 6,866,061 B2
DATED : March 15, 2005
INVENTOR(S) : Jianming Ye and Todd A. Simpson It is certified that error appears in the above-identified patent and that said Letters Patent is hereby corrected as shown below:

Column 9,
Line 20, delete "diagram" and substitute -- diaphragm --; and

Column 10,
Line 10, delete "chamber" and substitute -- chamber, --.

Signed and Sealed this

Twenty-eighth Day of June, 2005

JON W. DUDAS
*Director of the United States Patent and Trademark Office*